United States Patent Office 3,553,939
Patented Jan. 12, 1971

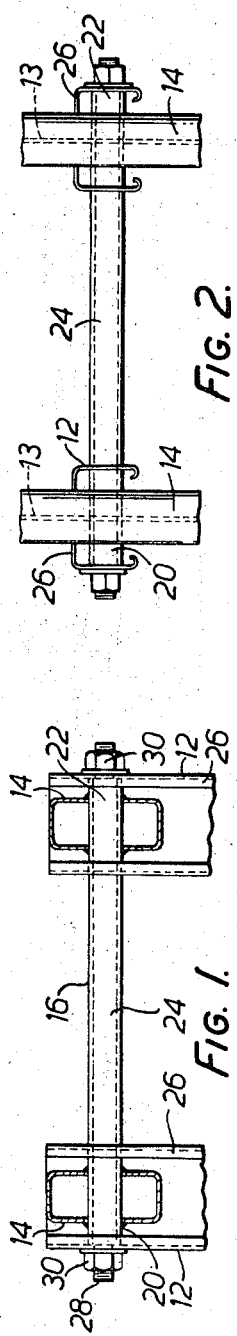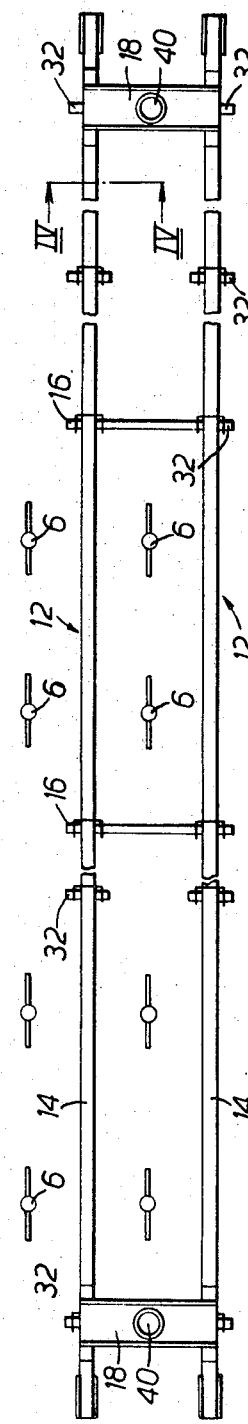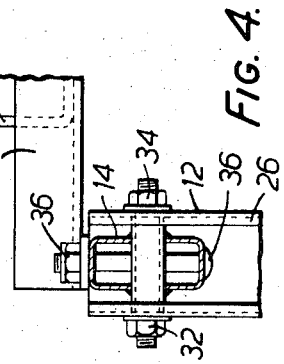

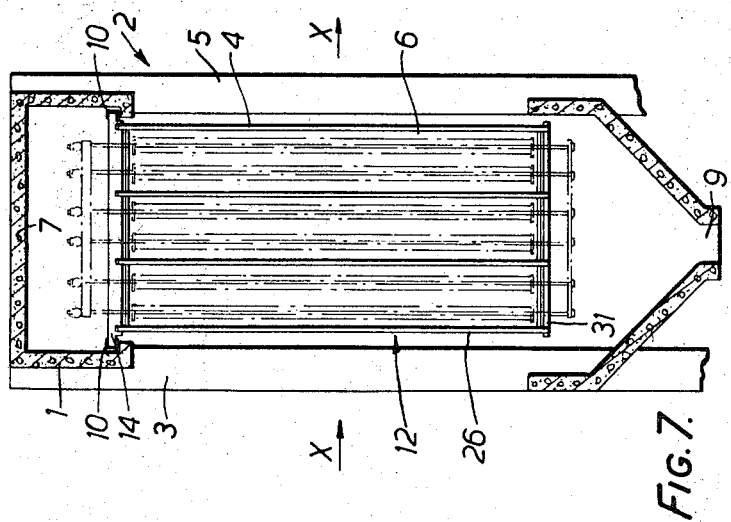
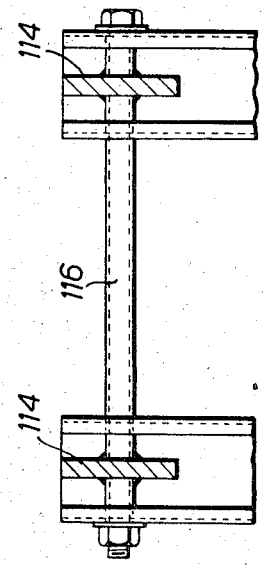
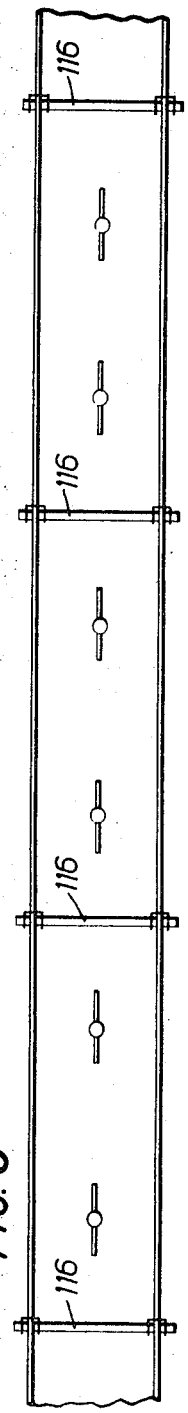

3,553,939
ELECTRO STATIC PRECIPITATOR HAVING MEANS TO SUPPORT THE COLLECTING ELECTRODES
John F. Dyla, Birmingham, England, assignor to Lodge-Cottrell Limited, Birmingham, England, a British company
Filed Mar. 28, 1969, Ser. No. 811,506
Claims priority, application Great Britain, Apr. 2, 1968, 15,903/68
Int. Cl. B03c 3/76
U.S. Cl. 55—112      10 Claims

ABSTRACT OF THE DISCLOSURE

An electro-precipitator comprises a casing, a plurality of spaced collector electrode assemblies, and a plurality of discharge electrodes located in spaces between the collector electrodes of the assemblies. Each collector electrode assembly comprises two vertical generally planar parallel collector electrodes each of which is secured to a horizontally elongated tubular support member mounted in the casing and from which the collector electrode extends downwardly, and the collector electrode assembly also comprises bracing means connecting together the support members of said assembly, said bracing means comprising one or more tubular assemblies spaced apart along the support members and each of which extends between the support members at right angles thereto. Each tubular assembly comprises two horizontal tubular members one secured in each support member, said two tubular members being opposite and aligned, a further tubular member aligned with and extending between said two aligned tubular members and a fastener extending through the three aligned tubular members to secure said tubular members together.

---

This invention is concerned with improvements in or relating to electro-precipitators.

A previously proposed electro-precipitator comprises a casing, a plurality of spaced collector electrodes supported in the casing and a plurality of discharge electrodes located in the spaces between the collector electrodes.

Structural problems may arise in supporting the collector electrodes in the casing, particularly in the larger sizes and it is an object of the present invention to minimise any such problems.

The present invention provides an electro-precipitator collector electrode assembly comprising (a) a plurality of spaced collector electrodes each of which is secured to a collector electrode support member from which it extends downwardly when the assembly is in use, and (b) bracing means connecting together adjacent support members of different collector electrodes of said assembly, said bracing means comprising a tubular assembly which extends between two adjacent support members and comprises two outer tubular members one secured to each support member, said two tubular members being opposite and aligned, a further, inner, tubular member aligned with and extending between said two aligned tubular members and a fastener extending through the three aligned tubular members to secure said tubular members together.

The invention also provides an electro-precipitator comprising a casing, a plurality of spaced collector electrode assemblies as set out in the last preceding paragraph supported in the casing and a plurality of discharge electrodes located in the spaces between the collector electrodes.

The invention also provides an electro-precipitator comprising a casing, a plurality of spaced collector electrode assemblies, and a plurality of discharge electrodes located in spaces between the collector electrodes of the assemblies, each collector electrode assembly comprising (a) two vertical generally planar parallel collector electrodes each of which is secured to a horizontally elongated tubular support member mounted in the casing and from which the collector electrode extends downwardly, and (b) bracing means connecting together the support members of said assembly, said bracing means comprising a tubular assembly which extends between the support members at right angles thereto and comprises two horizontal tubular members one secured in each support member, said two tubular members being opposite and aligned, a further tubular member aligned with and extending between said two aligned tubular members and a fastener extending through the three aligned tubular members to secure said tubular members together.

There now follows a description, to be read with reference to the accompanying drawings, of an electro-precipitator embodying the invention. This description is given by way of example of the invention only and not by way of limitation thereof.

In the accompanying drawings:

FIG. 1 is a sectional end view of parts of a collector electrode assembly of an electro-precipitator embodying the invention;

FIG. 2 is a plan view corresponding to FIG. 1;

FIG. 3 is an overall plan view of the collector electrode assembly;

FIG. 4 is a section on the line IV—IV of FIG. 3;

FIG. 5 is a sectional end view corresponding to FIG. 1 of a modified form of the collector electrode assembly shown in FIGS. 1 to 4;

FIG. 6 is a view corresponding to FIG. 3 of said modified form; and

FIG. 7 is a section through the electro-precipitator embodying the invention taken in a plane parallel to the gas flow therethrough.

The electro-precipitator embodying the invention comprises (FIG. 7) a casing 2, a plurality of spaced collector electrode assemblies 4 (only one of which is shown) independently supported in the casing 2, and a plurality of discharge electrodes 6 supported in the casing 2 and located in the spaces between the collector electrodes (see FIG. 3). The precipitator comprises a gas inlet 3 and a gas outlet 5, through which dust-laden gas to be cleaned is passed in the direction of the arrows X. The casing has a roof 7 and an outlet opening 9 for precipitated dust.

Each collector electrode assembly 4 comprises two spaced vertical generally planar parallel collector electrodes 12 of a know type whih comprises a plate portion 13 (FIGS. 2 and 7) and vertically extending channel members 26. Each collector electrode 12 is secured to and extends downwardly from a horizontally elongated tubular support member 14 of vertically elongated, rectangular cross-section; each support member 14 is mounted in the casing of the electro-precipitator by brackets 10.

The collector electrode assembly comprises bracing means connecting together the support members 14 of the assembly. The bracing means comprises two spaced tubular assemblies 16 extending between the support members 14 at right angles thereto and being symmetrically located intermediate end portions of the tubular members 14 close to the centres thereof. The bracing means also comprises grider members 18 extending between the support members 14 and located adjacent opposite end portions thereof.

Each tubular assembly 16 comprises a tubular member 20 of circular cross-section extending transversely through and secured in one member 14 and a tubular member 22 also of circular cross-section extending transversely through and secured in the other member 14; each member 20, 22 extends outwardly on either side of its member 14 and the member 20 is opposite to and aligned with the member 22; the assembly 16 also comprises a tubular member 24 which is aligned with and extends between the tubular members 20, 22; a vertical channel member 26 of the appropriate collector electrode 12 engages opposite end faces of the tubular member 20 and a channel member 26 of the other collector electrode 12 of the electrode assembly similarly engages opposite end faces of the tubular member 22; the channel members 26 also engage opposite end faces of the tubular member 24. The tubular assembly also comprises a rod 28 which extends through the channel members 26, the tubular members, 20, 22 and the tubular member 24 and is threaded at either end, with nuts 30 screwed thereonto to secure the tubular members 20, 22, 24 together, thereby bracing the members 14 together, the electrodes 12 also being secured to the tubular members 14 thereby. Lower end portions of the channel members 26 of each collector electrode are secured to a bottom bar 31 (FIG. 7); the bottom bars 31 are not braced together but are restrained against excessive movement by means not shown.

Each electrode 12 is similarly secured to its tubular member 14 at localities away from the assemblies 16 by tubular members 32 of circular cross-section secured in the tubular member 14 (FIGS. 3 and 4) and by nuts and bolts 34 passing through a channel member 26 of the electrode 12 and the tubular member 32, tubular members corresponding to the tubular members 24 being omitted between opposite tubular members 32.

The girder members 18 are secured to the tubular members 14 by nuts and bolts 36; each bolt 36 passes vertically through the appropriate tubular member 14. Each girder member 18 is symmetrically located over two opposite tubular members 32 and comprises an upstanding rapping anvil 40 arranged to receive rapping blows by rapping mechanism (not shown) in the operation of the electro-precipitator to dislodge precipitated dust from the electrodes 12 of the assembly.

In a modification (not shown) each tubular member 20, 22 32 instead of extending outwardly on either side of its tubular member 14, has each of its opposite end faces flush with an outer side surface of the tubular member 14.

The modified form of collector electrode assembly shown in FIGS. 5 and 6 corresponds in construction, arrangement and opeartion in many respects to the electro-precipitator collector electrode assembly described with reference to FIGS. 1 to 4 and 7 and is described insofar as it differs therefrom.

The modified form of collector electrode assembly comprises tubular assemblies 116 corresponding to the assemblies 16 but there are four of these assemblies 116 symmetrically spaced along the electrode assembly intermediate end portions thereof.

The assembly also comprises electrode support members 114 corresponding generally to the electrode support members 14 but the support members 114 are horizontally extending bars of vertically elongated, rectangular cross-section.

I claim:
1. An electro-precipitator collector electrode assembly comprising
 (a) a plurality of collector electrode support members,
 (b) a plurality of spaced collector electrodes each of which is secured to a collector electrode support member from which it extends downwardly when the assembly is in use, and
 (c) bracing means connecting together adjacent support members of different collector electrodes of said assembly,
said bracing means comprising a tubular assembly which extends between two adjacent support members and comprises two outer tubular members, one secured to each support member, said two tubular members being opposite and aligned, a further, inner, tubular member aligned with and extending between said two aligned tubular members and a fastener extending through the three aligned tubular members to secure said tubular members together.

2. An electrode assembly according to claim 1, wherein the bracing means comprises a plurality of such tubular assemblies each extending between said two adjacent support members and spaced apart along said support members.

3. An electrode assembly according to claim 1, wherein the bracing means also comprises a girder member extending between said two adjacent support members and secured to said support members.

4. An electrode assembly according to claim 3, wherein the bracing means comprises two such girder members each extending between said two adjacent support members and located adjacent opposite end portions of each of said two support members.

5. An electrode assembly according to claim 3, wherein said girder member comprises a rapping anvil.

6. An electrode assembly according to claim 4 wherein each girder member comprises a rapping anvil.

7. An electrode assembly according to claim 1, wherein each support member is tubular and has a rectangular cross-section which is downwardly elongated when the electrode assembly is in use.

8. An electrode assembly according to claim 1, wherein each said outer tubular member extends transversely through its collector electrode support member and is secured therein.

9. An electro-precipitator comprising a casing, a plurality of spaced collector electrode assemblies according to claim 1 supported in the casing and a plurality of discharge electrodes located in spaces defined between the collector electrodes.

10. An electro-precipitator comprising a casing, a plurality of spaced collector electrode assemblies, and a plurality of discharge electrodes located in spaces defined between the collector electrodes of the assemblies, each collector electrode assembly comprising
 (a) two horizontally elongated tubular support members mounted in the casing,
 (b) two vertical generally planar parallel collector electrodes each of which is secured to a tubular support member from which the collector electrode extends downwardly, and
 (c) bracing means connecting together the support members of said assembly,
said bracing means comprising a tubular assembly which extends between the support members at right angles thereto and comprises two horizontal tubular members, one secured in each support member, said two tubular members being opposite and aligned, a further tubular member aligned with and extending between said two aligned tubular members and a fastener extending through the three aligned tubular members to secure said tubular members together.

References Cited

UNITED STATES PATENTS

| 1,903,640 | 4/1933 | Wintermute | 55—112 |
| 2,470,356 | 5/1949 | MacKenzie | 55—145 |
| 2,488,712 | 11/1949 | Dahlman | 55—143 |
| 2,535,696 | 12/1950 | Richardson | 55—143 |
| 2,696,893 | 12/1954 | Richardson | 55—145X |
| 2,708,980 | 5/1955 | Hull | 55—112 |
| 2,721,622 | 10/1955 | Ditzler | 55—143X |
| 2,996,144 | 8/1961 | Phyl | 55—130 |

DENNIS E. TALBERT, Jr., Primary Examiner

U.S. Cl. X.R.
55—130, 148, 154